United States Patent
Cook et al.

(10) Patent No.: US 9,216,524 B1
(45) Date of Patent: Dec. 22, 2015

(54) LOW DENSITY SUBSEA BUOYANCY AND INSULATION MATERIAL AND METHOD OF MANUFACTURING

(71) Applicants: Timothy H. Cook, Rye, NH (US); David A. Capotosto, Biddeford, ME (US)

(72) Inventors: Timothy H. Cook, Rye, NH (US); David A. Capotosto, Biddeford, ME (US)

( * ) Notice: Subject to any disclaimer, the term of this patent is extended or adjusted under 35 U.S.C. 154(b) by 163 days.

(21) Appl. No.: 13/966,836

(22) Filed: Aug. 14, 2013

Related U.S. Application Data

(60) Provisional application No. 61/682,823, filed on Aug. 14, 2012.

(51) Int. Cl.
*B32B 3/14* (2006.01)
*B29C 44/20* (2006.01)

(52) U.S. Cl.
CPC ............. *B29C 44/20* (2013.01); *Y10T 428/231* (2015.01)

(58) Field of Classification Search
CPC ............................ Y10T 428/231; B29C 44/20
USPC ............................................. 428/69; 427/244
See application file for complete search history.

(56) References Cited

U.S. PATENT DOCUMENTS

| | | | |
|---|---|---|---|
| 4,021,589 A * | 5/1977 | Copley | ............................. 428/68 |
| 4,079,162 A * | 3/1978 | Metzger | ........................ 523/219 |
| 7,162,325 B2 | 1/2007 | Silverbrook | |
| 7,513,586 B2 | 4/2009 | Mataki | |
| 7,914,105 B2 | 3/2011 | Silverbrook | |
| 7,927,528 B2 | 4/2011 | Owens | |
| 8,029,096 B2 | 10/2011 | Silverbrook | |
| 8,057,731 B2 | 11/2011 | Abe | |
| 8,097,336 B2 | 1/2012 | Owens | |
| 8,122,939 B2 | 2/2012 | Hochsmann | |
| 8,155,774 B2 | 4/2012 | Wu | |

\* cited by examiner

*Primary Examiner* — Brent O'Hern
(74) *Attorney, Agent, or Firm* — James Creighton Wray; Meera P. Narasimhan

(57) ABSTRACT

The present invention relates to both a material construction and manufacturing method resulting in low density materials, especially for use as subsea buoyancy and insulation. The products are made by an additive manufacturing process, printing thin layers of a polymer material while leaving voids of precisely predetermined shapes, sizes and distribution, with precisely predetermined thicknesses between the voids. The resulting products provide optimized strength, buoyancy and insulative value with minimal material usage and density.

24 Claims, 4 Drawing Sheets

LOW DENSITY SUBSEA BUOYANCY AND INSULATION MATERIAL AND METHOD OF MANUFACTURING

This application claims the benefit of U.S. Provisional Application No. 61/682,823 filed Aug. 14, 2012, which is hereby incorporated by reference in its entirety as if fully set forth herein.

BACKGROUND OF THE INVENTION

Low density/high strength materials are used in subsea industries in a wide variety of applications. The primary purpose of the materials is to lend buoyancy and/or thermal insulation to equipment and structures to reduce load and/or minimize heat loss. The material of choice for this purpose is epoxy and glass microsphere-based syntactic foam. The epoxy provides strength to withstand the extreme pressures subsea. The hollow glass microspheres provide buoyancy and insulative value.

This material and the processes used to manufacture and convert these materials into buoyant/insulative objects have remained essentially unchanged for over 50 years. The most common process consists of mixing epoxy resins with hollow glass microspheres (also known as microballoons), dispensing this mixture into molds or rotationally-molded plastic housings and then curing. In some cases, to increase buoyancy and/or insulative value further, macrospheres (also known as minispheres, 0.2"-2.0" in diameter) are added to the molds or housings and the syntactic foam is poured around them. In almost all cases, secondary manufacturing processes are necessary to complete the objects.

Since the applications for these materials vary widely, innumerable sized and shaped forms must be created. Custom tooling must almost always be produced to cast the parts. This is an expense and also adds time to each project.

There are numerous drawbacks to this existing material and methodology which have yet to be overcome. A first drawback is that the bulk processing methodology relies on random arrangement of both microspheres and/or macrospheres (both of which contain a distribution of sizes) to create voids within the epoxy. As such, theoretical maximum packing of voids is never achieved. For example, an object with regularly-sized spheres, carefully packed, can achieve a void density of 74%. Maximum void density achieved by random packing of microspheres yields approximately 64%. With the addition of macrospheres to the syntactic foam, void density can be increased further but will never result in optimum sphere packing.

A second drawback is that the spheres are permitted to touch one another or have only a minimum thickness of epoxy between them. Ideally, there would be a carefully calculated thickness of epoxy between each void space to maximize composite strength and insulative value, and minimize density.

A third drawback is that random packing and batch processing technology allows for areas of castings to be void of epoxy. These spaces have microspheres or macrospheres that are not properly encapsulated in epoxy, resulting in weak sections in the objects.

Needs exist for improved subsea buoyancy and insulation materials and processes to meet the challenging demands of subsea applications.

SUMMARY OF THE INVENTION

The present invention relates to both a material construction and manufacturing method resulting in low density materials, especially for use as subsea buoyancy and insulation. The products are made by an additive manufacturing process, printing thin layers of a polymer material while leaving voids of precisely predetermined shapes, sizes and distribution, with precisely predetermined thicknesses between the voids. The resulting products provide optimized strength, buoyancy and insulative value with minimal material usage and density.

The present invention provides material with optimized void spaces created by additive manufacturing, also known as 3D printing. The result is a low density material suitable for use in high pressure/force applications using a methodology of precisely arranging voids and precisely controlling material thicknesses around and between voids to minimize density whilst maximizing strength.

Material is selected and designed by beginning with the application's geometric, pressure, density and/or insulative constraints. The solution is modeled in 3D CAD, and the void spaces are optimized. The strength of the result can be verified through finite element analysis (FEA). Upon completion of the design, the 3D CAD model is prepared for printing. The material is printed layer by layer using the additive manufacturing process. The material is uniform or varied within the layers and/or within adjacent layers.

Optimization of void space is achieved through varying void size and shape, void placement, wall thickness between voids and external wall thicknesses.

In one embodiment the voids are spheres, and the spheres are of varied sizes chosen for optimum packing, strength and/or insulative value. In another embodiment, the voids are oblate spheroids. Void shapes are unlimited and are based on the density, strength and/or insulative project requirements.

In one embodiment, the material is printed at atmospheric pressure. In other embodiments, the material incorporating the void volumes is printed in increased or reduced ambient pressures. In another embodiment, the void spaces may be filled with gases other than air which are present by filling the printer enclosure with selected, usually inert, gases.

In one embodiment the printed material is unitary. In another embodiment the void spaces are encapsulated by specific printed materials, and the balance of the printed material is a different material. In another embodiment an additional material is printed as an external shell. In another embodiment reinforcing materials, either printed or placed, are added to increase strength.

The invention provides the supplanting of all instances of use of syntactic foam in subsea buoyancy and insulation material. An inherent value of the invention is the resultant material structure of precisely arranged voids in solid polymer. The material structure can be manufactured practically by using additive manufacturing processes. A low density material suitable for use in high pressure/force applications uses a methodology of precisely arranging voids and precisely controlling material thicknesses around and between the voids to minimize density while maximizing strength. A wide list of materials to print and materials to add includes as examples epoxy, vinyl esters, thermoplastics, polyurethanes, syntactic foam, styrenes, nanoparticles, glass fibers, carbon fibers, microspheres and natural fibers. Manufacturing process can also be performed under atmospheric pressure, reduced or increased pressure for controlling internal pressures in the voids and controlling air or gas content in the voids.

The invention provides strong low density objects with minimized density with maximized strength for use in high pressure/force applications. Objects have precisely controlled voids and precisely controlled material thickness between the precisely controlled voids. The material is a polymer containing fibers, nanoparticles, glass fibers, carbon fibers, microspheres, or natural fibers. The material is solid polymer, epoxy, vinyl, esters, thermoplastics, polyurethanes, syntactic foam or styrenes. The voids contain a vacuum or gas under atmospheric pressure, increased pressure or reduced pressure.

The gas is air, an inert gas or a low density gas.

In one form, the material is a first material, and the voids are surrounded by a second material between the first material and the voids. The first material and the second material are formed in thin sequential layers. The sequential layers of the first material and the second material are sequential layers deposited by an additive manufacturing process. The material is formed in thin layers.

A shell is formed around an outside of the material.

A new method forms a low density three-dimensional high pressure and force resistant subsea buoyancy object by forming a material sequentially in thin layers around precisely controlled sizes and positions of voids, while precisely controlling thicknesses of the material around and between the voids. The method uses an additive manufacturing process, such as three-dimensional printing. The method includes printing the material in an enclosure having a vacuum or a gas under a controlled pressure, wherein the voids contain the vacuum or the gas under the controlled pressure.

In one method the material is a first material and a second material is deposited in the thin layers between the first material and the voids, thereby forming surfaces of the second material surrounding the voids between the voids and the first material. An outer material layer is formed outside the first material around the object.

These and further and other objects and features of the invention are apparent in the disclosure, which includes the above and ongoing written specification, with the claims and the drawings.

DETAILED DESCRIPTION

Figure 1:
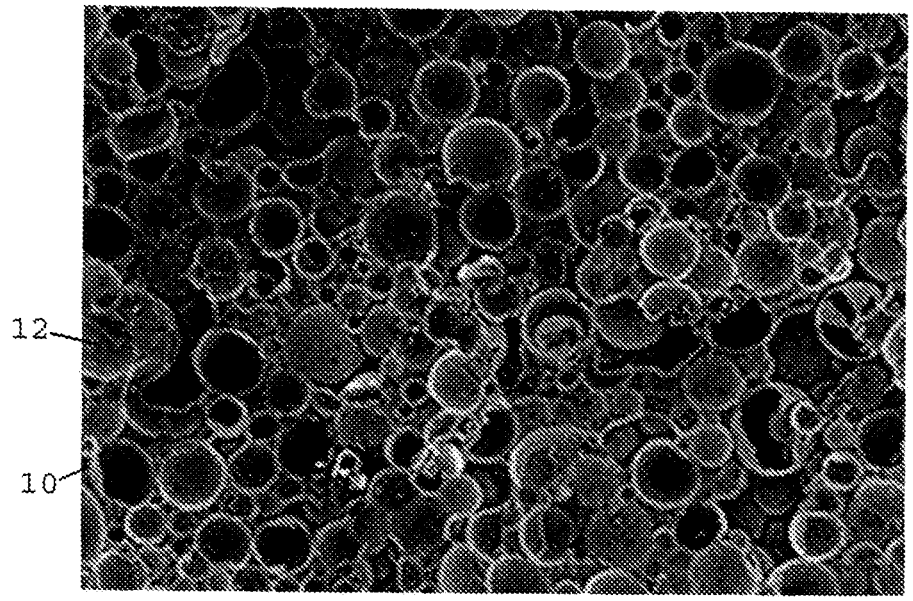
FIG. 1 shows a cross-section of microspheres randomly mixed in an epoxy.

FIG. 1 is a microscopic image of a cross-section of microspheres 12 randomly mixed in epoxy 10. The image shows both the variation in size and shape of the microspheres 12, as well as the random packing of those spheres in the epoxy 10.

Figure 2:
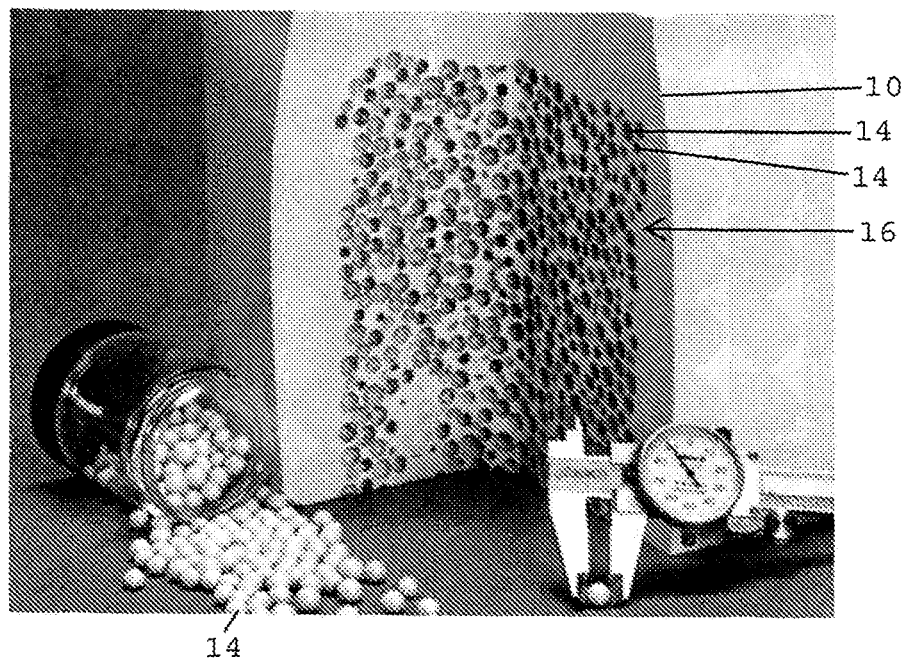
FIG. 2 shows microspheres and macrospheres together in a casting as well as some loose macrospheres.

FIG. 2 shows macrospheres 14 of different sizes together with microsphere-filled foam in prior art syntactic foam casting 10 as well as some loose macrospheres 14. The image shows both the variation in size and shape of the macrospheres 14, as well as the random packing 16 of those spheres.

Figure 3:
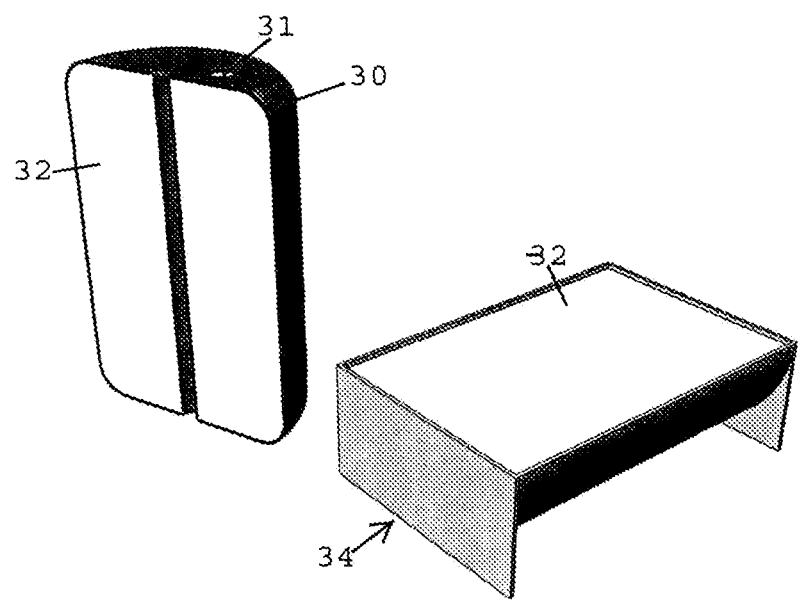
FIG. 3 shows a cutaway of a plastic shell filled with foam and a mold containing syntactic foam.

FIG. 3 shows a cutaway of a plastic shell 30 filled with foam 32 and a mold 34 containing syntactic foam 32. In this image the objects are shown with syntactic foam 32 without macrospheres. The plastic housing has a fill port 31 through which the housing is filled. Once poured and cured, the object may undergo secondary operations (like drilling of mounting holes) before being ready for shipment. The mold shown 34 is typical. Molds are often made of wood or metal. The foam would be poured into open area of the mold and cured. After curing the foam 32 would be removed from the mold 34 and finished.

Figure 4:
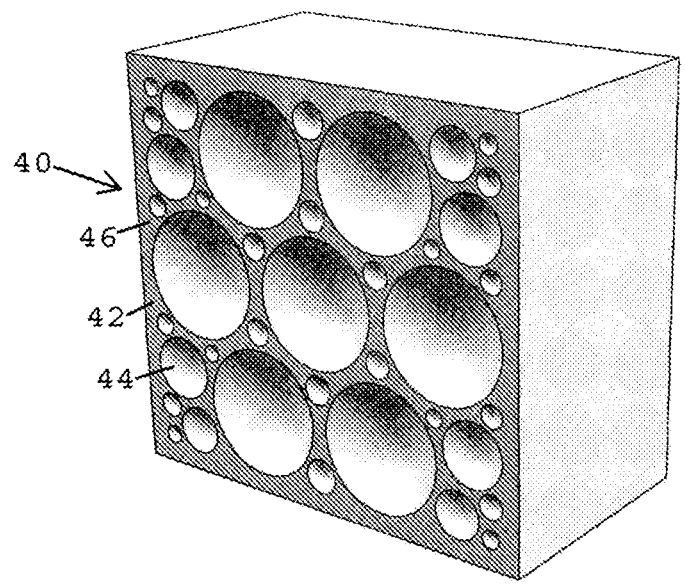
FIG. 4 shows an example of the invention in a cutaway of a printed part showing a solid material with different sized voids inside.

FIG. 4 shows a cutaway of a printed part 40 of the invention, showing a solid material 42 with different sized voids 44 inside. The void sizes, shapes and placement and the thickness of the solid material 46 between the voids are optimized to produce the best density/strength ratio for the application.

Figure 5:
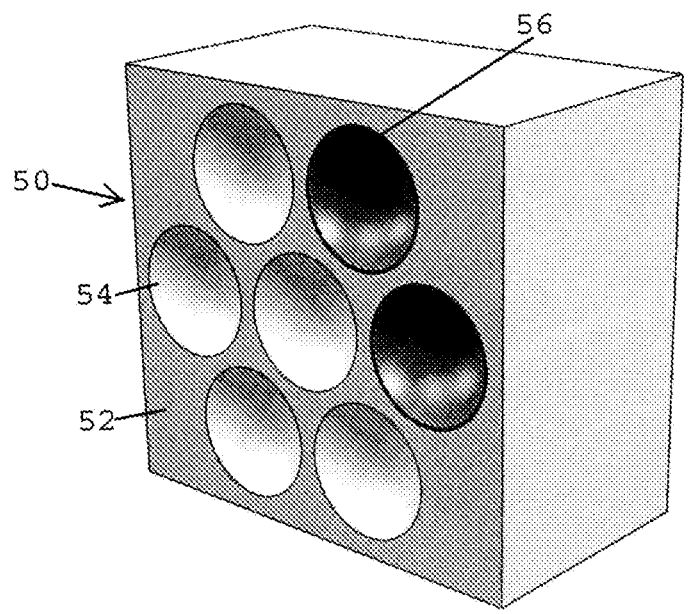
FIG. 5 shows an example of the invention with a printed part that demonstrates naked voids and voids encapsulated by a material that is different from the primary solid material.

FIG. 5 shows a printed part 50 of the invention that demonstrates naked voids 54 and voids 56 encapsulated by a material that is different from the primary solid material 52. A secondary material may be used to increase accuracy of sphere shape and size or to increase processing speeds by allowing the void shapes 56 to be printed precisely and the primary solid material 52 to be printed more rapidly.

Figure 6:
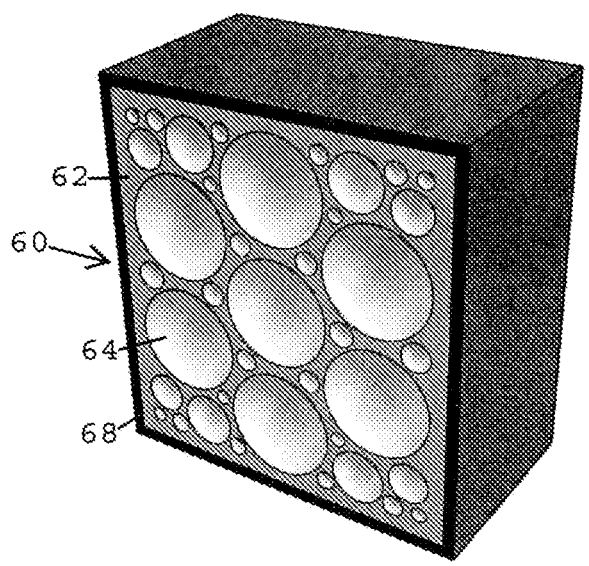
FIG. 6 shows an example of a cutaway of a new printed part showing a solid material with different sized voids inside and a printed exterior shell of a secondary material.

FIG. 6 shows a cutaway of a printed part 60 showing a solid material 62 with different sized voids 64 inside and a printed exterior shell 68 of a secondary material. Printing of an exterior shell creates a protective or decorative external surface and can eliminate the need for a secondary finishing process.

Figure 7:
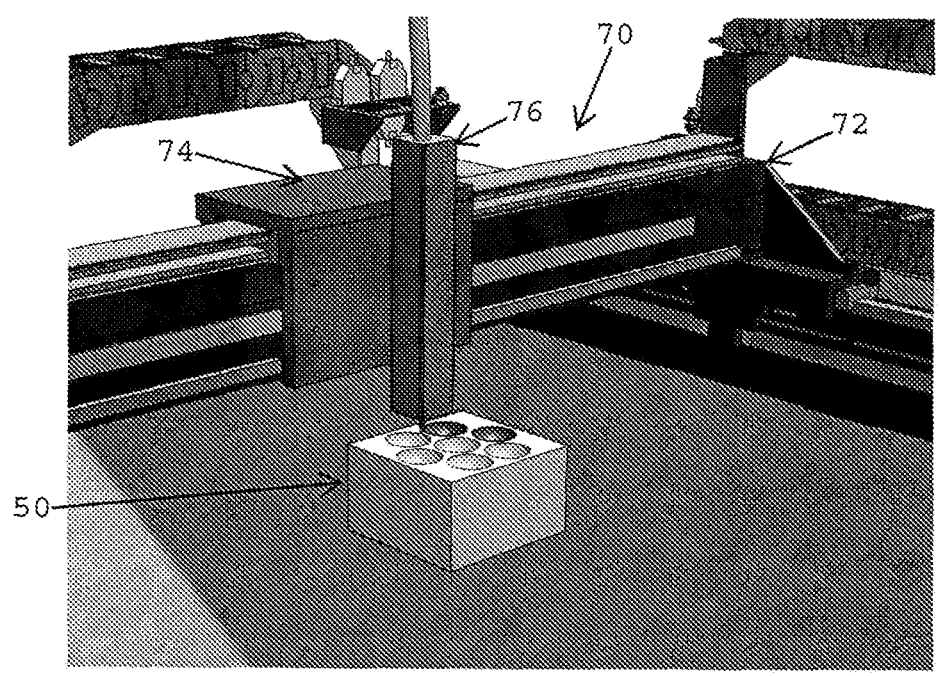
FIG. 7 is a schematic example of a part being printed.

FIG. 7 shows a part 50 being printed. The machine 70 includes components 72, 74 that allow for multiple axis movement of dispensing equipment 76 and/or printed part 50. The movements are computer controlled.

While the invention has been described with reference to specific embodiments, modifications and variations of the invention may be constructed without departing from the scope of the invention, which is defined in the following claims.

We claim:

1. An apparatus comprising an object usable as a subsea buoyancy object and capable of being formed by 3-D printing having a material with plural sequential layers, voids within the material at pre-determined locations in the plural sequential layers and pre-determined material thickness between the pre-determined locations of the voids, the sequential layers of material being additive layers forming the object with minimized density and with maximized strength.

2. The apparatus of claim 1, wherein the material is a polymer comprising substances selected from the group consisting of fibers, nanoparticles, glass fibers, carbon fibers, microspheres, natural fibers and combinations thereof.

3. The apparatus of claim 1, wherein the material is selected from the group consisting of polymer, epoxy, vinyl, esters, thermoplastics, polyurethanes, syntactic foam, styrenes and combinations thereof.

4. The apparatus of claim 1, wherein the voids are filled with gas.

5. The apparatus of claim 4, wherein the gas is air.

6. The apparatus of claim 4, where in the gas is an inert gas.

7. The apparatus of claim 4, wherein the gas is at atmospheric pressure.

8. The apparatus of claim 4, wherein the gas is at pressures above ambient pressure.

9. The apparatus of claim 1, wherein the voids are under a vacuum.

10. The apparatus of claim 1, wherein the material is a first material and the voids are surrounded by a second material between the first material and the voids.

11. The apparatus of claim 10, wherein the first material and the second material form the plural sequential layers.

12. The apparatus of claim 10, wherein the plural sequential layers of the first material and the second material are plural sequential additive layers deposited by an additive manufacturing process.

13. The apparatus of claim 1, wherein the layers are printed layers of the material comprising stacks of sequential print layers.

14. The apparatus of claim 1, further comprising a shell comprising additive sequential shell layers around an outside of the material.

15. The apparatus of claim 1, wherein the voids have shapes selected from the group consisting of spherical, oblate spheroids, and combinations thereof.

16. The apparatus of claim 1, wherein the object is a subsea buoyancy object.

17. The apparatus of claim 1, wherein the object is an insulation object.

18. The apparatus of claim 1, wherein the object is a 3-D printed object.

19. A method of forming a three-dimensional high pressure and force resistant subsea buoyancy object comprising forming a material sequentially in plural sequential layers, forming voids within the material at pre-determined locations in the plural sequential layers with pre-determined material thickness between the pre-determined locations of the voids, controlling sizes and positions of the voids, forming the sequential layers of material as additive layers, and forming the object with minimized density and with maximized strength.

20. The method of claim 19, wherein the forming the material comprises depositing the material in the sequential layers by an additive manufacturing process.

21. The method of claim 20, further comprising printing the material in an enclosure having a vacuum or a gas under a controlled pressure, wherein the voids contain the vacuum or the gas under controlled pressure.

22. The method of claim 21, wherein the printing the material comprises printing a first material and further comprising printing a second material in layers between the first material and the voids and thereby forming surfaces of the second material surrounding the voids between the voids and the first material.

23. The method of claim 22, further comprising printing an outer material layer outside the first material around the object.

24. The method of claim 21, wherein the printing the material comprises 3-D printing the sequential layers and the voids.

* * * * *